United States Patent
Shigemitsu (10) Patent No.: US 10,365,881 B2
(45) Date of Patent: Jul. 30, 2019

(54) IMAGE SUPPLYING APPARATUS, METHOD FOR CONTROLLING IMAGE SUPPLYING APPARATUS, AND PROGRAM

(71) Applicant: SEIKO EPSON CORPORATION, Tokyo (JP)

(72) Inventor: Makoto Shigemitsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 112 days.

(21) Appl. No.: 15/488,000

(22) Filed: Apr. 14, 2017

(65) Prior Publication Data

US 2017/0308350 A1    Oct. 26, 2017

(30) Foreign Application Priority Data

Apr. 25, 2016 (JP) .................................. 2016-086882

(51) Int. Cl.
| | |
|---|---|
| G09G 5/12 | (2006.01) |
| G06F 3/14 | (2006.01) |
| H04N 1/31 | (2006.01) |

(52) U.S. Cl.
CPC .......... *G06F 3/1462* (2013.01); *G06F 3/1415* (2013.01); *G09G 5/12* (2013.01); *H04N 1/31* (2013.01); *G09G 2330/021* (2013.01); *G09G 2370/16* (2013.01)

(58) Field of Classification Search
USPC ................ 348/E05.077, 173, 154; 358/1.15; 375/E07.192; 386/226
See application file for complete search history.

(56) References Cited

U.S. PATENT DOCUMENTS

| | | | | |
|---|---|---|---|---|
| 6,762,743 B2* | 7/2004 | Yoshihara | ............ | G09G 3/3406 345/102 |
| 7,123,246 B2* | 10/2006 | Nakatani | ............... | G06F 3/1415 345/204 |
| 8,035,607 B2* | 10/2011 | Otome | ................. | G09G 3/3648 345/102 |

(Continued)

FOREIGN PATENT DOCUMENTS

| | | | | |
|---|---|---|---|---|
| JP | 2003-50694 A | 2/2003 | | |
| JP | 2006-262116 A | 9/2006 | | |
| WO | WO-2007057053 A1 * | 5/2007 | ........... | G06F 3/1454 |

*Primary Examiner* — Bryan Earles
(74) *Attorney, Agent, or Firm* — Oliff PLC (57) ABSTRACT

An terminal apparatus includes a terminal communication section that transmits image data to a projector, an image data generating section that generates comparison result image data representing a result of comparison between a post-update image data and a pre-update image data, and an evaluation section that evaluates whether or not the comparison result image data generated by the image data generating section represents that there is no difference between the pre-update image data and the post-update image data. The evaluation section evaluates the comparison result image data whenever a frame cycle elapses in a case where the comparison result image data represents that there is difference and evaluates the comparison result image data after a period longer than the frame cycle elapses in a case where the comparison result image data represents that there is no difference between the pre-update image data and the post-update image data.

8 Claims, 4 Drawing Sheets

(56) References Cited

U.S. PATENT DOCUMENTS

| | | | | |
|---|---|---|---|---|
| 8,928,639 | B2* | 1/2015 | Lee | G06F 13/14 |
| | | | | 345/204 |
| 8,960,925 | B2* | 2/2015 | Huang | G09G 3/002 |
| | | | | 353/121 |
| 2002/0196378 | A1* | 12/2002 | Slobodin | G06F 3/1415 |
| | | | | 348/744 |
| 2006/0209340 | A1* | 9/2006 | Ishii | H04N 19/87 |
| | | | | 358/1.15 |
| 2008/0204396 | A1* | 8/2008 | Otome | G09G 3/3648 |
| | | | | 345/102 |
| 2011/0007968 | A1* | 1/2011 | Yamada | H04N 17/00 |
| | | | | 382/165 |
| 2013/0265294 | A1* | 10/2013 | Kim | G09G 3/20 |
| | | | | 345/214 |
| 2013/0316689 | A1* | 11/2013 | Iwasaki | H04L 67/14 |
| | | | | 455/418 |
| 2018/0268765 | A1* | 9/2018 | Okamoto | G02F 1/133 |

* cited by examiner

IMAGE SUPPLYING APPARATUS, METHOD FOR CONTROLLING IMAGE SUPPLYING APPARATUS, AND PROGRAM

CROSS-REFERENCE

The entire disclosure of Japanese Patent Application No. 2016-86882, filed Apr. 25, 2016, is expressly incorporated by reference herein.

BACKGROUND

1. Technical Field

The present invention relates to an image supplying apparatus, a method for controlling the image supplying apparatus, and a program.

2. Related Art

There is a known apparatus that supplies image data to a display apparatus that displays an image, such as a projector (see JP-A-2006-262116, for example). JP-A-2006-262116 discloses an image supplying apparatus that compares image data having been transmitted with image data representing the latest image to be displayed on a screen, extracts a difference between the former image data and the latter image data, and transmits difference data representing the difference to an image receiving apparatus to suppress the amount of data transmitted to the image receiving apparatus.

The apparatus described in JP-A-2006-262116, when it performs the image data comparison and the difference extraction, evaluates in some cases whether or not data representing a result of the comparison shows that there is no difference between the compared sets of data. In this process, performing the evaluation on all sets of data each representing a result of the comparison results in a large evaluation burden.

SUMMARY

An advantage of some aspects of the invention is to provide an image supplying apparatus, a method for controlling the image supplying apparatus, and a program that allow reduction in data evaluation burden.

An image supplying apparatus according to an aspect of the invention includes a transmission section that transmits image data to a display apparatus, a data generating section that generates comparison result data representing a result of comparison between a first image data and a second image data, and an evaluation section that evaluates whether or not the comparison result data generated by the data generating section represents that there is no difference between the first image data and the second image data, and the evaluation section evaluates the comparison result data whenever a first period elapses in a case where the comparison result data represents that there is difference between the first image data and the second image data and evaluates the comparison result data after a second period longer than the first period elapses in a case where the comparison result data represents that there is no difference between the first image data and the second image data.

According to the configuration described above, in the case where there is no difference between the compared sets of data, the period that elapses before the evaluation of the following comparison result data is changed, whereby the burden of the evaluation of the comparison result data can be reduced.

In the image supplying apparatus according to the aspect of the invention, the data generating section may compare the first image data and the second image data transmitted by the transmission section to the display apparatus with each other to generate the comparison result data, and the transmission section may not transmit the second image data to the display apparatus in the case where the evaluation section determines that the comparison result data represents that there is no difference between the first image data and the second image data.

According to the configuration described above, in the case where a result of the evaluation shows that the comparison result image data is data representing that there is no difference between the compared sets of data, no image data is transmitted to the display apparatus, whereby the burden of transmission of image data can be reduced.

In the image supplying apparatus according to the aspect of the invention, the data generating section may generate image data as the comparison result data, and the evaluation section may evaluate whether or not the comparison result data generated by the data generating section satisfies a predetermined condition.

According to the configuration described above, the burden of the evaluation of the comparison result data can be more greatly reduced.

The image supplying apparatus according to the aspect of the invention may be a portable apparatus that includes a battery and operates based on electric power from the battery.

According to the configuration described above, in the case where there is no difference between the compared sets of image data, the burden of the evaluation of the comparison result data can be reduced, whereby the consumption of the electric power in the battery can be suppressed.

In the image supplying apparatus according to the aspect of the invention, the transmission section may wirelessly transmit the image data to the display apparatus.

According to the configuration described above, the burden of wireless transmission of image data to the display apparatus can be reduced, whereby the consumption of the electric power in the battery can be suppressed.

The image supplying apparatus according to the aspect of the invention may further include a display section that displays an image based on the image data, and the data generating section may acquire the image data to be displayed by the display section, compare the first image data and the second image data with each other, and generate the comparison result data.

According to the configuration described above, since image data representing an image to be displayed by the display section is the target of the comparison, the evaluation section can evaluate whether or not the comparison result data is data representing that the image data displayed by the display section does not change.

Another aspect of the invention relates to a method for controlling an image supplying apparatus that transmits image data to a display apparatus, the method comprising generating comparison result data representing a result of comparison between a first image data and a second image data, evaluating the comparison result data whenever a first period elapses in a case where the comparison result data represents that there is difference between the first image data and the second image data and evaluating the comparison result data after a second period longer than the first period elapses in a case where the comparison result data represents that there is no difference between the first image data and the second image data.

According to the configuration described above, in the case where there is no difference between the compared sets of data, the period that elapses before the evaluation of the following comparison result data is changed, whereby the burden of the evaluation of the comparison result data can be reduced.

Another aspect of the invention relates to a non-transitory computer-readable medium storing a program to be executed by a control section that controls an image supplying apparatus that transmits image data to a display apparatus, the program causing the control section to generate comparison result data representing a result of comparison between a first image data and a second image data, evaluate whether or not the generated comparison result data represents that there is no difference between the first image data and the second image data, and evaluate the comparison result data whenever a first period elapses in a case where the comparison result data represents that there is difference between the first image data and the second image data and evaluate the comparison result data after a second period longer than the first period elapses in a case where the comparison result data represents that there is no difference between the first image data and the second image data.

According to the configuration described above, in the case where there is no difference between the compared sets of data, the period that elapses before the evaluation of the following comparison result data is changed, whereby the burden of the evaluation of the comparison result data can be reduced.

The invention can also be embodied, for example, in the form of a storage medium on which the program described above is stored, a server apparatus that distributes the program, a transport medium that transports the program described above, or a data signal carrying the program described above embodied in a carrier wave. The storage medium can be a variety of computer readable media and may be a magnetic storage medium, an optical storage medium, or a medium using a semiconductor memory device or may be any other type of storage medium. The storage medium may instead be a portable storage medium, such as a memory card. The storage medium may still instead be a storage medium provided in an apparatus connected to the image supplying apparatus described above over a communication line.

The program described above can be implemented as a single application program that runs on an operating system in an apparatus that operates under the operating system installed therein. The program is not limited to a single application program and may be implemented in the form of a plurality of functions of an operating system, a device driver, and an application program. For example, a device driver program that controls an operation device having an operation surface and/or a program module that accepts operation performed on the operation device in an operating system may cooperate with each other to achieve the program described above. Still instead, a plurality of application programs may achieve the program described above according to the aspect of the invention. That is, a specific form of the program is arbitrarily determined.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
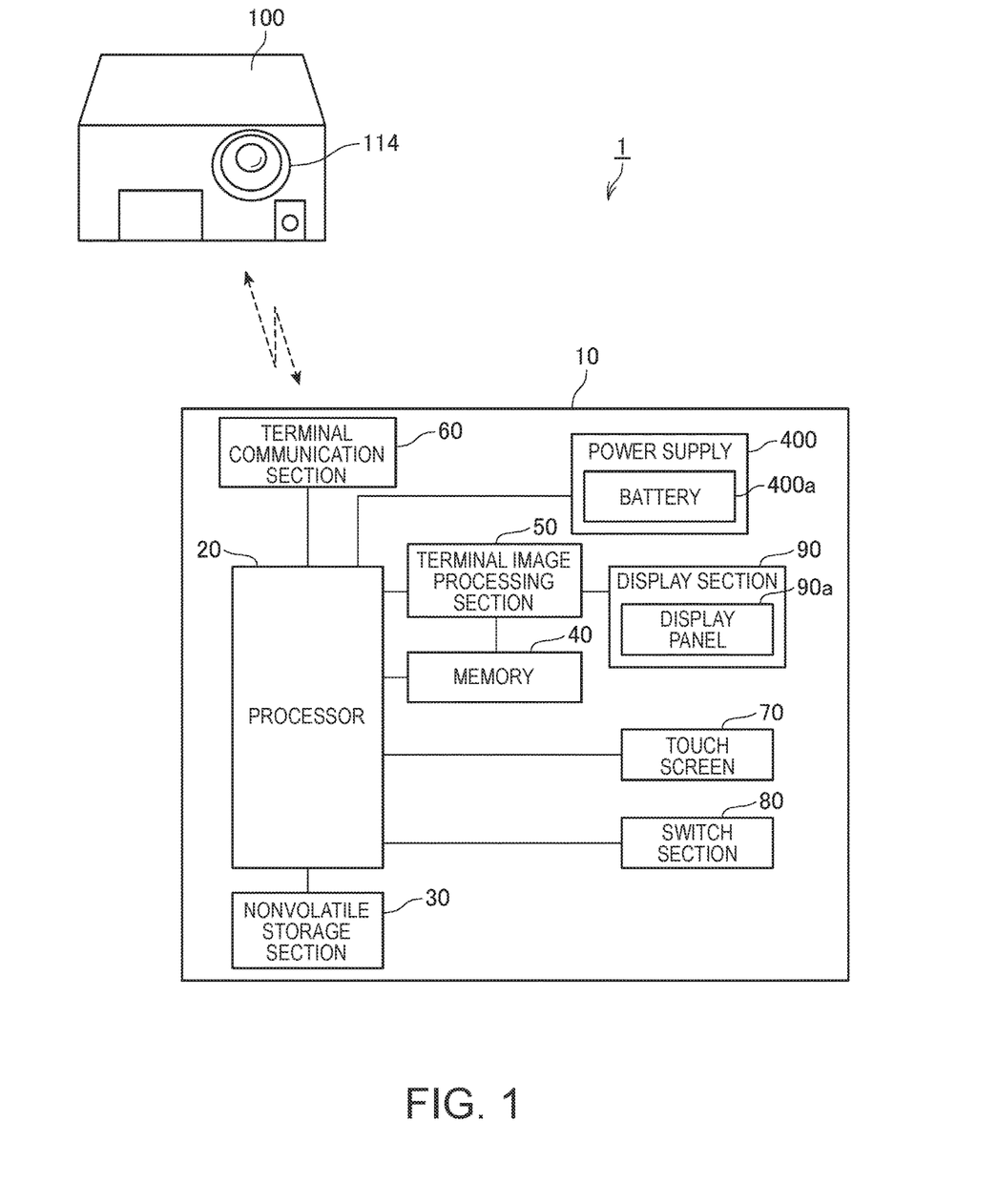
FIG. 1 shows an image projection system and the configuration of a terminal apparatus in the image projection system.

FIG. 1 shows an image projection system 1 and the configuration of a terminal apparatus 10 (image supplying apparatus) in the image projection system 1.

The image projection system 1 includes the terminal apparatus 10 and a projector 100 (display apparatus).

The terminal apparatus 10 is, for example, a mobile phone, such as a smartphone, or a portable apparatus, such as a tablet terminal and a PDA (personal digital assistant). The terminal apparatus 10 includes a battery 400*a* and operates based on electric power supplied from the battery 400*a*. The terminal apparatus 10 further includes a display section 90, which displays a variety of images. The terminal apparatus 10 transmits image data representing an image displayed by the display section 90 to the projector 100.

The projector 100 projects image light toward a projection target to form an image based on the image data on the surface of the projection target. The projection target on which the projector 100 projects an image may be a flat surface, a curved surface, or an irregular surface. In the present embodiment, a case where the projector 100 projects an image on a screen SC (FIG. 3) formed of a flat surface is presented by way of example. The screen SC may be a fixed flat surface, such as a wall surface, or a hanging or standing curtain-shaped screen. The projector 100 is provided with a projection opening 114, through which the image light is projected. The projection opening 114 is an opening through which a projection system 113 (FIG. 3), which is built in the projector 100, radiates light.

In the present embodiment, the projector 100 and the terminal apparatus 10 are connected to each other in such a way that they can transmit and receive a variety of data by between them using a wireless communication method. The wireless communication method can, for example, be a short-distance wireless communication method, such as wireless LAN (local area network), Bluetooth (registered trademark), UWB (ultra-wide band), and infrared communication, or a wireless communication method using a mobile phone line.

In the image projection system 1, which is formed of the terminal apparatus 10 and the projector 100, the terminal apparatus 10 transmits image data representing an image displayed by the display section 90 of the terminal apparatus 10 to the projector 100, and the projector 100 projects an image based on the received image data. That is, in the image projection system 1, the image projected by the projector 100 on the screen SC is the same image displayed by the display section 90 of the terminal apparatus 10.

In addition to the image displayed by the display section 90, the terminal apparatus 10 can transmit other image data to the projector 100. For example, the terminal apparatus 10 may transmit image data on still images or video contents stored in a nonvolatile storage section 30. In a case where the terminal apparatus 10 includes an imaging section (camera), the terminal apparatus 10 may transmit image data on an image captured with the imaging section or an image produced on the basis of the captured image. In this case as well, the projector 100 projects an image on the basis of the image data transmitted from the terminal apparatus 10.

The terminal apparatus 10 includes a processor 20, as shown in FIG. 1. To the processor 20 is connected the nonvolatile storage section 30, a memory 40, a terminal image processing section 50, a touch screen 70, a switch section 80, and a power source 400. The processor 20 transmits and receives data and signals to and from the portions described above to control the portions in the terminal apparatus 10.

The nonvolatile storage section 30 is formed, for example, of a flash memory or an EEPROM (electrically erasable programmable read only memory) and stores a program executed by the processor 20 and a variety of data processed by the processor 20 when the processor 20 executes the program.

The memory 40 forms a work area that temporarily stores the program executed by the processor 20 and data processed by the processor 20 when the processor 20 executes the program.

The terminal image processing section 50 develops, in a video memory 301 (FIG. 2) in the memory 40, image data representing an image displayed on a display panel 90a of the display section 90. The terminal image processing section 50 further performs resolution conversion, adjustment of the color tone and brightness of an image, and other types of processing on the image data developed in the video memory 301.

The terminal apparatus 10 includes the display section 90. The display section 90 includes the display panel 90a formed, for example, of a liquid crystal display, an EL (electroluminescence) display, or any other type of panel. The display section 90 causes the display panel 90a to display an image based on the image data having been developed in the video memory 301 by the terminal image processing section 50 and having undergone the image processing performed by the terminal image processing section 50.

The terminal apparatus 10 includes a terminal communication section 60 (transmission section). The terminal communication section 60 includes an antenna, an RF circuit, and other components and is connected to the processor 20. The terminal communication section 60 is controlled by the processor 20 and transmits and receives a variety of data to and from the projector 100 in accordance with the wireless communication method described above. In the present embodiment, the terminal communication section 60 wirelessly transmits image data representing an image displayed by the display section 90.

The terminal apparatus 10 includes the touch screen 70 and the switch section 80. The touch screen 70 detects contact operation performed on the display panel 90a and outputs a position signal representing the detected operation position to the processor 20. The processor 20 produces coordinate information representing the coordinates on the touch screen 70 on the basis of the position signal inputted from the touch screen 70. The switch section 80 includes operation parts, such as switches, provided separately from the touch screen 70, and when any of the switches is operated, the switch section 80 outputs an operation signal to the processor 20. The processor 20 produces operation information corresponding to the operated operation part on the basis of the operation signal inputted from the switch section 80.

The terminal apparatus 10 includes the power supply 400. The power supply 400 includes the battery 400a, which is a rechargeable secondary cell, and supplies each portion of the terminal apparatus 10 with the electric power stored in the battery 400a.

Figure 2:
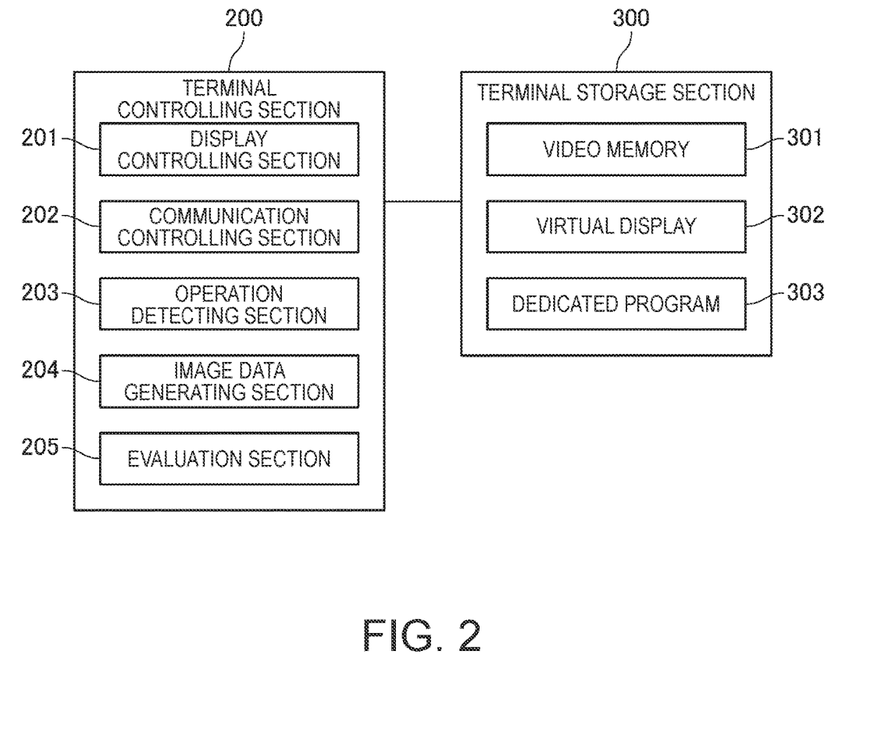
FIG. 2 is a configuration block diagram of a terminal controlling section and a terminal storage section.

FIG. 2 is a functional block diagram of a terminal control section 200 (control section), which forms a control system of the terminal apparatus 10, and a terminal storage section 300.

The terminal storage section 300 shown in FIG. 2 is a logical storage section formed of the nonvolatile storage section 30 and/or the memory 40. The terminal control section 200 and each functional section provided in the terminal control section 200 are formed by cooperation between software and hardware when the processor 20 executes the program. The terminal control section 200 and each functional section provided in the terminal control section 200 are formed, for example, of the processor 20, the memory 40, and the nonvolatile storage section 30.

The terminal storage section 300 includes the video memory 301, a virtual display 302, and a dedicated program 303 (program).

The video memory 301 is formed, for example, of a RAM and is a temporal storage area where image data on an image displayed on the display panel 90a is developed by the terminal image processing section 50 and undergoes image processing performed by the terminal image processing section 50. In the following description, image data processed by the terminal image processing section 50 is the image data having been developed in the video memory 301 and having undergone the image processing. The image data processed on the video memory 301 by the terminal image processing section 50 is stored, for example, in the terminal storage section 300.

The virtual display 302 is formed, for example, of a RAM, as the video memory 301 is, and is a temporal storage area where image data is developed. In the virtual display 302, comparison result image data (comparison result data) generated by an image data generating section 204 (data generating section) is developed. The comparison result image data will be described later. The comparison result image data developed in the virtual display 302 is transmitted to the projector 100.

The dedicated program 303 is a program that allows the terminal control section 200 to function as a display controlling section 201, a communication controlling section 202, an operation detecting section 203, the image data generating section 204, and an evaluation section 205 on the basis of the cooperation between software and hardware. The dedicated program 303 is installed in the terminal apparatus 10 in advance.

The terminal control section 200 includes the display controlling section 201, the communication controlling section 202, the operation detecting section 203, the image data generating section 204, and the evaluation section 205.

The display controlling section 201 controls the display section 90 to cause the display panel 90a to display a variety of images. The display controlling section 201 outputs image data read, for example, from the nonvolatile storage section 30 or image data received via the terminal communication section 60 to the terminal image processing section 50. The terminal image processing section 50 processes the inputted image data. That is, the terminal image processing section 50 develops the image data in the video memory 301 and performs image processing on the developed image data. The image data processed by the terminal image processing section 50 is outputted to the display section 90. The display section 90 displays an image on the display panel 90a on the basis of the inputted image data.

The communication controlling section 202 controls the terminal communication section 60 to cause it to wirelessly communicate with the projector 100. To start communication with the projector 100, the communication controlling section 202 carries out a predetermined process for establishing connection between the terminal communication section 60 and a communication section 175 provided in the projector 100. Further, the communication controlling section 202 transmits the comparison result image data generated by the image data generating section 204 to the projector 100.

The operation detecting section 203 produces information on the basis of signals inputted from the touch screen 70 and the switch section 80. That is, the operation detecting section 203 produces coordinate information representing the coordinates on the touch screen 70 on the basis of the position signal inputted from the touch screen 70. Further, the operation detecting section 203 produces operation information corresponding to an operated operation part on the basis of the operation signal inputted from the switch section 80.

The image data generating section 204 performs comparison that will be described later to generate the comparison result image data when the video memory 301 is updated.

The update of the video memory 301 refers to the process of overwriting image data developed by the terminal image processing section 50 in the video memory 301 with image data that follows. In detail, after the terminal image processing section 50 develops image data for displaying a predetermined image in the video memory 301, the developed image data is removed from the video memory 301, and image data representing an image that follows the predetermined image is developed in the video memory 301. In a case where the terminal apparatus 10 processes video (motion image) data formed of successive frames, the image data generating section 204 sequentially develops the individual frames that form the video data in the video memory 301.

In the following description, image data newly processed on the video memory 301 in the process of updating the video memory 301 is called post-update image data (second image data). Further, image data processed on the video memory 301 before the post-update image data is developed in the video memory 301 is called pre-update image data (first image data). In a case where the terminal apparatus 10 sequentially develops a first frame and a second frame that are successive frames in the video memory 301, the first frame corresponds to the pre-update image data, and the second frame corresponds to the post-update image data.

The image data generating section 204 compares the pre-update image data with the post-update image data and generates the comparison result image data representing a result of the comparison. The comparison performed by the image data generating section 204 includes, for example, the process of comparing pixel data on individual pixels that form the two sets of image data with each other and evaluating whether or not the two sets of image data coincide with each other. The image data generating section 204 compares pixel data on the pixel in a predetermined position (coordinates) in the pre-update image data with pixel data on the pixel in the predetermined position (coordinates) in the post-update image data. That is, the image data generating section 204 compares two sets of pixel data on the pixels in the same position in the pre-update image data and the post-update image data with each other. The image data is formed, for example, of RGB values.

In the present embodiment, the comparison result image data generated by the image data generating section 204 is black image data or the post-update image data. The black image data is image data formed of pixels all representing black. In a case where the pre-update image data and the post-update image data are identical to each other, the image data generating section 204 generates the black image data.

The image data generating section 204 compares the RGB values of a pixel in the pre-update image data with those of the corresponding pixel in the post-update image data. Specifically, the image data generating section 204 calculates differences in the RGB values between a pixel in the pre-update image data and the corresponding pixel in the post-update image data. In a case where the calculated differences in the RGB values for each of the pixels satisfy a preset condition, the image data generating section 204 then generates the black image data as the comparison result image data. The preset condition is, for example, a condition that the calculated differences in the RGB values are all zero. On the other hand, in a case where a result of the comparison shows that the calculated differences in the RGB values for each of the pixels are not zero, that is, in a case where a result of comparison between at least one pair of pixels shows that the differences in the RGB values are not zero, the image data generating section 204 generates the post-update image data as the comparison result image data. The image data generating section 204 develops the generated comparison result image data in the virtual display 302.

Whenever the video memory 301 is updated, the image data generating section 204 compares the pre-update image data with the post-update image data and generates the black image data or the post-update image data as the comparison result image data. The period that elapses before the video memory 301 is updated, that is, the interval from a point of time when the video memory 301 is updated to a point of time when the video memory 301 is next updated (the period can also be called update cycle) corresponds to the frame cycle (first period). In a case where the frame rate is 60 Hz, the frame cycle is 1/60 seconds. The image data generating section 204 generates the comparison result image data whenever one frame cycle (1/60 seconds, for example) elapses. The comparison result image data generated by the image data generating section 204 is developed in the virtual display 302 whenever one frame cycle (1/60 seconds, for example) elapses.

The evaluation section 205 evaluates whether or not the comparison result image data developed in the virtual display 302 is image data that satisfies a predetermined condition. In the present embodiment, the evaluation section 205 evaluates whether or not the comparison result image data developed in the virtual display 302 is the black image data. The evaluation section 205 evaluates whether or not the comparison result image data is the black image data on the basis of the pixels contained in the comparison result image data. For example, in a case where the pixels in the comparison result image data are all pixels representing black, that is, in a case where (R,G,B)=(0,0,0), the evaluation section 205 determines that the comparison result image data corresponds to the black image data. For example, in a case where at least one of the pixels in the comparison result image data is not a pixel representing black, the evaluation section 205 determines that the comparison result image data does not correspond to the black image data. That is, the evaluation section 205 determines that the comparison result image data is the post-update image data.

In the case where there is no difference between the pre-update image data and the post-update image data, the image data generating section 204 generates the black image data as the comparison result image data, as described above. On the other hand, in the case where there is a difference between the pre-update image data and the post-update image data, the image data generating section 204 generates the post-update image data as the comparison result image data. Therefore, when the evaluation section 205 determines that the comparison result image data corresponds to the black image data, the comparison result image data is image data representing that there is no difference between the pre-update image data and the post-update image data. On the other hand, when the evaluation section 205 determines that the comparison result image data does not correspond to the black image data, the comparison result image data is image data representing that there is a difference between the pre-update image data and the post-update image data. In the case where the pre-update image data and the post-update image data are identical to each other, the image data generating section 204 may instead generate comparison result image data representing a predetermined color other than black. In this case, the terminal apparatus 10 evaluates whether or not the comparison result image data is data representing the predetermined color.

Figure 3:
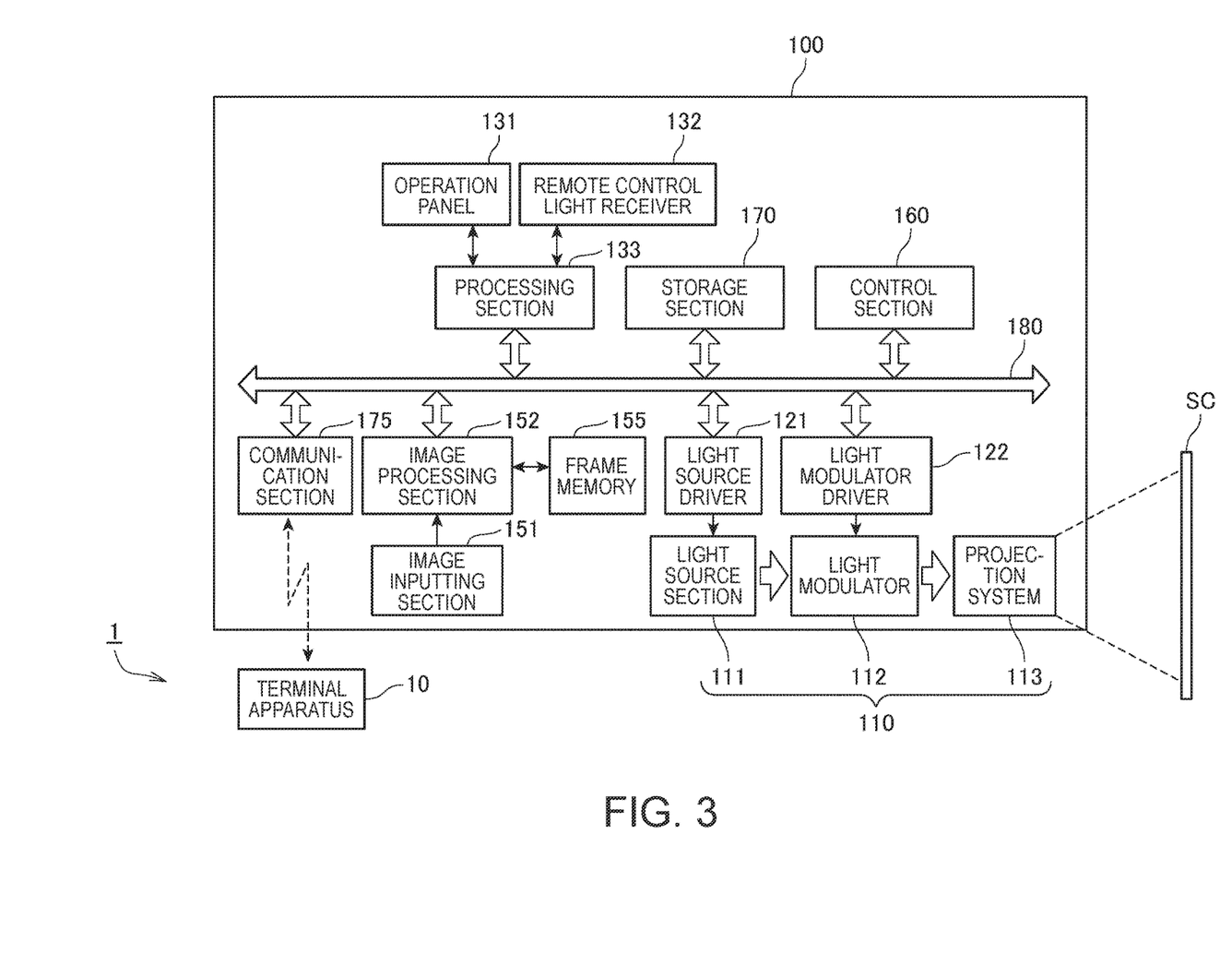
FIG. 3 shows the configuration of a projector.

The configuration of the projector 100 will next be described.

FIG. 3 shows the configuration of the projector 100.

The projector 100 includes an image inputting section 151. The image inputting section 151 includes a connector to which a cable is connected and an interface circuit (neither of them is shown), and image data supplied from an apparatus connected via the cable to the image inputting section 151 is inputted thereto.

The projector 100 includes a projection section 110, which forms an optical image and projects the optical image on the screen SC. The projection section 110 includes a light source section 111, a light modulator 112, and the projection system 113.

The light source section 111 includes a light source, such as a lamp, an LED (light emitting diode), and a laser light source.

The light source section 111 is driven by a light source driver 121. The light source driver 121 is connected to an internal bus 180. The light source driver 121 supplies the light source section 111 with drive electric power to turn on and off the light source in the light source section 111 under the control of a control section 160. The luminance of the light source in the light source section 111 may be configured as to be adjustable in accordance with the drive electric power supplied by the light source driver 121.

The light modulator 112 includes three liquid crystal panels corresponding to the RGB primary colors. The light outputted from the light source section 111 is separated into RGB three-color light fluxes, which are incident on the respective liquid crystal panels. Each of the three liquid crystal panels is a transmissive liquid crystal panel and modulates light passing therethrough to generate image light. The image light fluxes having passed through the liquid crystal panels and having therefore been modulated are combined with one another by a light combining system, such as a cross dichroic prism, and the combined light exits toward the projection system 113.

A light modulator driver 122, which drives the liquid crystal panels of the light modulator 112, is connected to the light modulator 112. The light modulator driver 122 is connected to the internal bus 180. The light modulator driver 122 generates R, G, and B image signals on the basis of image data inputted from an image processing section 152. The light modulator driver 122 drives, on the basis of the generated R, G, and B image signals, the respective liquid crystal panels in the light modulator 112 to draw images in the liquid crystal panels.

The projection system 113 includes a lens group that projects the image light modulated by the light modulator 112 toward the screen SC to form an image on the screen SC.

The projector 100 includes an operation panel 131 and a processing section 133. The processing section 133 is connected to the internal bus 180. The operation panel 131 includes a variety of switches operated by a user and indicator lamps. The operation panel 131 is connected to the processing section 133. The processing section 133 causes the indicator lamps on the operation panel 131 to illuminate or blink as appropriate in accordance with the action state and setting state of the projector 100 under the control of the control section 160. When any of the switches on the operation panel 131 is operated, an operation signal corresponding to the operated switch is outputted from the processing section 133 to the control section 160.

The projector 100 further includes a remote control light receiver 132, which receives an infrared signal transmitted from a remote control (not shown) used by the user. The remote control light receiver 132 is connected to the processing section 133. The remote control light receiver 132 receives an infrared signal transmitted from the remote control. The processing section 133 decodes the infrared signal received by the remote control light receiver 132, generates data representing the operation performed on the remote control, and outputs the data to the control section 160.

The projector 100 includes the communication section 175. The communication section 175 includes an antenna, an RF (radio frequency) circuit, and other components that are not shown and wirelessly communicates with the terminal apparatus 10 in accordance with a wireless communication standard under the control of the control section 160. In the present embodiment, the communication section 175 receives image data transmitted from the terminal apparatus 10.

The projector 100 includes an image processing system. The image processing system is primarily formed of the control section 160, which integrally controls the entire projector 100, and further includes the image processing section 152, a frame memory 155, and a storage section 170. The control section 160, the image processing section 152, and the storage section 170 are connected to the internal bus 180.

The image processing section 152 develops image data received by the communication section 175 or image data inputted from the image inputting section 151 in the frame memory 155 under the control of the control section 160. The image processing section 152 performs a resolution conversion (scaling) process, a resizing process, a distortion correction process, a shape correction process, a digital zoom process, adjustment of the color tone and brightness of an image, and other processes on the image data developed in the frame memory 155. The image processing section 152 carries out a process specified by the control section 160 and further carries out as necessary a process using a parameter inputted from the control section 160. The image processing section 152 can, of course, carry out a plurality of the processes described above in combination. The image processing section 152 reads processed image data from the frame memory 155 and outputs the image data to the light modulator driver 122.

The control section 160 includes a CPU (central processing unit), a ROM (read only memory), a RAM (random access memory), and other types of hardware (none of them is shown). The ROM is a nonvolatile storage device formed, for example, of a flash ROM and a semiconductor storage element and stores a control program executed by the CPU and a variety of data. The RAM forms a work area used by the CPU. The CPU develops the control program read from the ROM or the storage section 170 in the RAM and executes the control program developed in the RAM to control each portion of the projector 100.

The storage section 170 is a nonvolatile storage device and is achieved, for example, by a flash memory, an EPROM (erasable programmable read only memory), an EEPROM, an HDD (hard disk drive), or any other storage device. The storage section 170 stores, for example, image data projected by the projection section 110 on the screen SC.

The image data generating section 204 generates the comparison result image data whenever the video memory 301 is updated, as described above. For example, in the case where the period that elapses before the video memory 301 is updated is the frame cycle, the image data generating section 204 generates the comparison result image data whenever one frame cycle elapses. The comparison result image data is therefore developed in the virtual display 302 whenever one frame cycle elapses. In a case where different sets of image data are developed in frame cycles in the video memory 301, for example, in the case of motion images, to appropriately evaluate whether or not there is a difference between two sets of image data, the evaluation section 205 performs the evaluation on all comparison result image data developed in frame cycles. In a case where an image displayed by the display section 90 does not change, that is, in a case where the same image data is successively developed in the video memory 301, the black image data is continuously developed as the comparison result image data in the virtual display 302. In this case, if the evaluation section 205 performs the evaluation on all comparison result image data, the evaluation section 205 evaluates in frame cycles whether or not the comparison result image data is the black image data although the same comparison result image data is successively developed, resulting in a large evaluation burden.

In view of the situation described above, the terminal apparatus 10 according to the present embodiment performs the following action.

Figure 4:
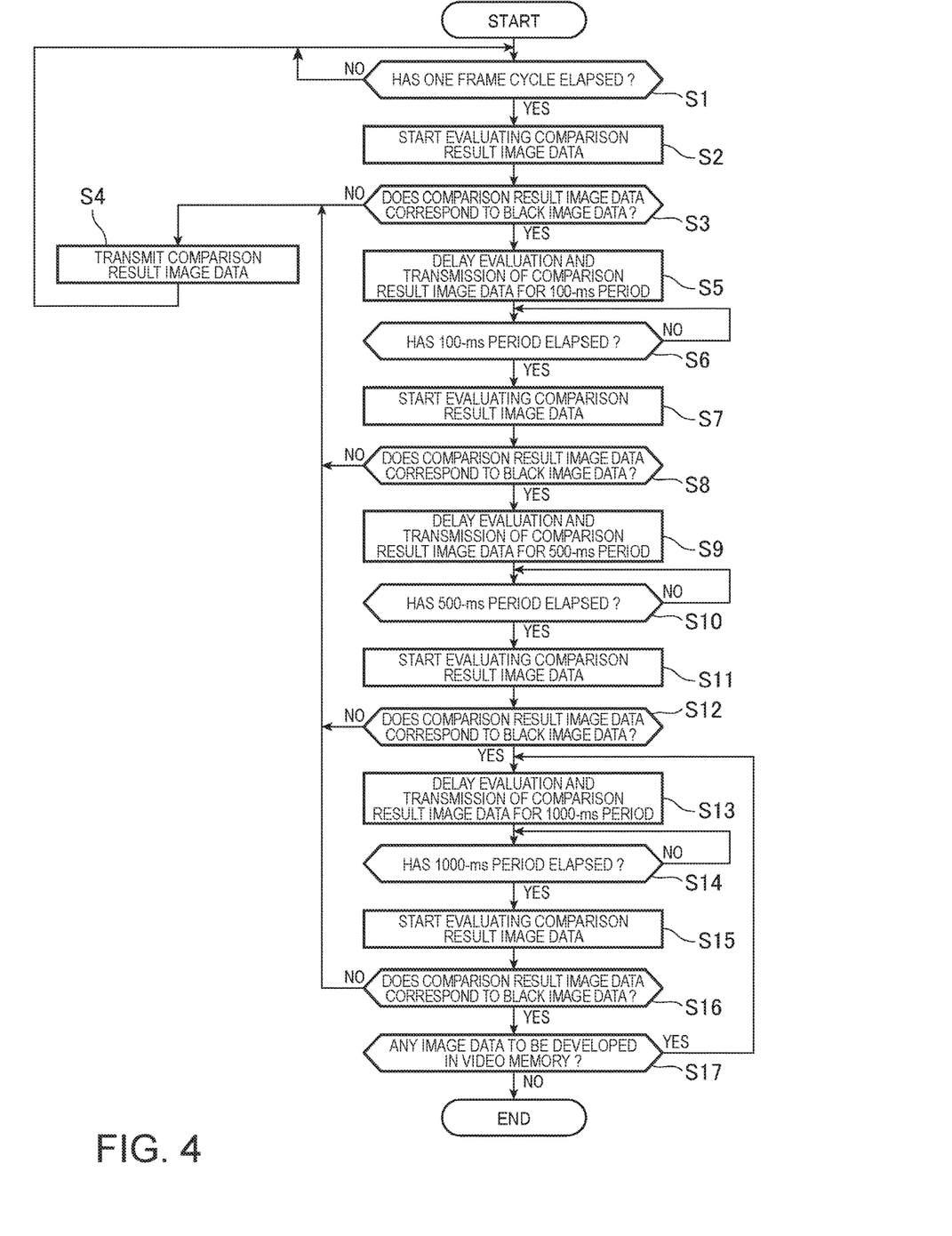
FIG. 4 is a flowchart showing the action of the terminal apparatus.

FIG. 4 is a flowchart showing the action of the terminal apparatus 10 according to the present embodiment.

In the present embodiment, the description will be made of a case where the video memory 301 is updated whenever one frame cycle elapses. In this case, the image data generating section 204 generates the comparison result image data whenever one frame cycle elapses in response to the update of the video memory 301. Since the image data generating section 204 generates the comparison result image data, the comparison result image data is developed in the virtual display 302 whenever one frame cycle elapses.

The evaluation section 205 in the terminal apparatus 10 evaluates whether or not one frame cycle has elapsed since the preceding comparison result image data was developed in the virtual display 302 (step S1). In a case where a result of the evaluation shows that one frame cycle has elapsed (YES in step S1), the evaluation section 205 starts evaluating the comparison result image data developed after one frame cycle elapses (step S2). The evaluation of the comparison result image data is evaluation of whether or not the comparison result image data corresponds to the black image data.

The evaluation section 205 then evaluates whether or not the comparison result image data corresponds to the black image data (step S3). That is, the evaluation section 205 evaluates whether or not the comparison result image data is image data representing that there is no difference between the pre-update image data and the post-update image data. For example, in the case where all pixels in the comparison result image data are pixels representing black, the evaluation section 205 determines that the comparison result image data corresponds to the black image data. On the other hand, for example, when the evaluation section 205 determines that at least one of the pixels in the comparison result image data is a pixel that does not represent black, the evaluation section 205 determines that the comparison result image data does not correspond to the black image data. That is, the evaluation section 205 determines that the comparison result image data is the post-update image data. The method for evaluating the comparison result image data is not limited to the method described above.

When a result of the evaluation shows that the comparison result image data does not correspond to the black image data (NO in step S3), the communication controlling section 202 in the terminal apparatus 10 causes the terminal communication section 60 to transmit the comparison result image data developed in the virtual display 302 to the projector 100 (step S4). Having transmitted the comparison result image data to the projector 100, the terminal apparatus 10 returns to the process in step S1. That is, the evaluation section 205 evaluates again whether or not one frame cycle has elapsed.

As described above, the terminal control section 200 of the terminal apparatus 10 carries out, whenever one frame cycle elapses, the process of transmitting the comparison result image data to the projector 100 when the evaluation section 205 determines that the comparison result image data does not correspond to the black image data. That is, in the case where there is a difference between the pre-update image data and the post-update image data, the terminal control section 200 transmits the comparison result image data developed in the virtual display 302 to the projector 100 whenever one cycle elapses. Therefore, for example, in the case where different sets of image data, such as motion images, are developed in the video memory 301 in frame cycles, the projector 100 can project images in frame cycles.

On the other hand, when a result of the evaluation in step S3 shows that the comparison result image data corresponds to the black image data (YES in step S3), the evaluation section 205 delays evaluation of the comparison result image data for 100 ms (second period) (hereinafter referred to as "100-ms period") after the evaluation section 205 starts evaluating (carrying out evaluation of) the comparison result image data in step S2 (Step S5). During the delay in step S5, the comparison result image data is developed in the virtual display 302. In the present embodiment, the comparison result image data is developed in the virtual display 302 and the comparison result image data is updated whenever one frame cycle elapses, but the evaluation section 205 delays the evaluation.

The communication controlling section 202 delays execution of the process of transmitting the comparison result image data developed in the virtual display 302 via the terminal communication section 60 to the projector 100 for the 100-ms period, which is the delay period in step S5. That is, the terminal communication section 60 delays transmission of the comparison result image data to the projector 100 for the 100-ms period (step S5). The 100-ms period is a period longer than the frame cycle (1/60 seconds).

The evaluation section 205 in the terminal apparatus 10 then evaluates whether or not the 100-ms period has elapsed (step S6). When the evaluation section 205 determines that the 100-ms period has elapsed (YES in step S6), the evaluation section 205 starts evaluating the comparison result image data developed in the virtual display 302 (step S7). The evaluation process that starts in step S7 is the same as the evaluation process in step S2.

The evaluation section 205 then evaluates whether or not the comparison result image data that starts undergoing the evaluation in step S7 corresponds to the black image data (step S8). That is, the evaluation section 205 evaluates whether or not the comparison result image data developed in the virtual display 302 when the 100-ms period has elapsed corresponds to the black image data.

The black image data is comparison result image data generated in the case where there is no difference between the pre-update image data and the post-update image data. That is, development of the black image data in the virtual display 302 means that there is no difference between the pre-update image data and the post-update image data. This means that an image displayed by the display section 90 in the terminal apparatus 10 does not change. An example of the aspect in which an image displayed by the display section 90 in the terminal apparatus 10 does not change may include a case where an image based on the same image data is displayed in frame cycles, for example, in the case of a still image.

In the aspect described above, it is highly probable that the period for which the image displayed by the display section 90 does not change is a period longer than at least one frame cycle. That is, in the case where there is no difference between the pre-update image data and the post-update image data, it is highly probable that the comparison result image data to be evaluated when the following frame cycle elapses is the black image data. That is, in the case where the image displayed by the display section 90 does not change, it is highly probable that the period for which the black image data is continuously developed in the virtual display 302 is longer than one frame cycle. In this case, the necessity for the evaluation section 205 to evaluate the comparison result image data whenever one frame cycle elapses is low. Therefore, in the case where the comparison result image data developed in the virtual display 302 is the black image data, the evaluation section 205 can perform the following evaluation after a period longer than one frame cycle elapses. The frequency of the evaluation performed by the evaluation section 205 therefore decreases, whereby the evaluation burden can be reduced. Further, the terminal communication section 60 delay transmission of the comparison result image data but waits for the period longer than one frame cycle. The frequency of the wireless transmission to the projector 100 via the terminal communication section 60 therefore decreases, whereby the burden of transmission of the comparison result image data to the projector 100 can be reduced.

Further, since the frequency of the evaluation of the comparison result image data and the frequency of the transmission of the comparison result image data decrease, the consumption of the electric power in the battery 400*a* can be suppressed.

When a result of the evaluation in step S8 shows that the comparison result image data having started undergoing the evaluation in step S7 does not correspond to the black image data (NO in step S8), the communication controlling section 202 in the terminal apparatus 10 transmits the comparison result image data to the projector 100 via the terminal communication section 60 (step S4). The terminal apparatus 10 then returns to the process in step S1 and evaluates again whether or not one frame cycle has elapsed. After one frame cycle elapses, the evaluation section 205 in the terminal apparatus 10 evaluates the comparison result image data developed in the virtual display 302. That is, in the case where the comparison result image data evaluated after the 100-ms period elapses does not correspond to the black image data, the terminal control section 200 of the terminal apparatus 10 changes the period that elapses before the evaluation is performed to the frame cycle.

On the other hand, when a result of the evaluation in step S8 shows that the comparison result image data having started undergoing the evaluation in step S7 corresponds to the black image data (YES in step S8), the evaluation section 205 delays evaluation of the comparison result image data developed in the virtual display 302 in frame cycles for 500 ms (hereinafter referred to as "500-ms period") after the evaluation of the comparison result image data in step S7 starts (step S9). Further, the communication controlling section 202 delays execution of the process of transmitting the comparison result image data developed in the virtual display 302 via the terminal communication section 60 to the projector 100 for the 500-ms period. That is, the terminal communication section 60 delays transmission of the comparison result image data to the projector 100 for the 500-ms period (step S9). The 500-ms period is a period longer than the frame cycle (1/60 seconds), as the 100-ms period is.

The evaluation section 205 in the terminal apparatus 10 then evaluates whether or not the 500-ms period has elapsed after the evaluation in step S7 (step S10). When a result of the evaluation shows that the 500-ms period has elapsed (YES in step S10), the evaluation section 205 starts, when it determines that the 500-ms period has elapsed, evaluating the comparison result image data developed in the virtual display 302 (step S11). The evaluation process that starts in step S11 is the same as those in steps S2 and S7.

The evaluation section 205 then evaluates whether or not the comparison result image data having started undergoing the evaluation in step S11 corresponds to the black image data (step S12). That is, the evaluation section 205 evaluates whether or not the comparison result image data developed in the virtual display 302 when the 500-ms period elapses corresponds to the black image data.

As described above, in the case where the comparison result image data developed when the 100-ms period elapses is the black image data, the terminal apparatus 10 further prolongs the period for which the terminal apparatus 10 delays the evaluation of the comparison result image data (hereinafter referred to as "evaluation delay period") and performs the following evaluation after the evaluation delay period elapses. The evaluation section 205 can therefore further reduce the frequency of the evaluation of the comparison result image data and can hence reduce the evaluation burden. Further, since the terminal communication section 60 delays transmission of the comparison result image data for the 500-ms period, the frequency of the transmission can be reduced, whereby the burden of transmission of the comparison result image data to the projector 100 can be reduced.

When a result of the evaluation in step S12 shows that the comparison result image data having started undergoing the evaluation in step S11 does not correspond to the black image data (NO in step S12), the communication controlling section 202 in the terminal apparatus 10 transmits the comparison result image data to the projector 100 via the terminal communication section 60 (step S4). The terminal apparatus 10 then returns to the process in step S1 and evaluates again whether or not one frame cycle has elapsed. The evaluation section 205 in the terminal apparatus 10 then evaluates the comparison result image data developed in the virtual display 302 after one frame cycle elapses.

On the other hand, in the case where a result of the evaluation in step S12 shows that the comparison result image data having started undergoing the evaluation in step S11 corresponds to the black image data (YES in step S12), the evaluation section 205 delays evaluation of the comparison result image data developed in the virtual display 302 in frame cycles for 1000 ms (hereinafter referred to as "1000-ms period") after the evaluation of the comparison result image data in step S11 starts (step S13). Further, the communication controlling section 202 delays execution of the process of transmitting the comparison result image data developed in the virtual display 302 to the projector 100 via the terminal communication section 60 for the 1000-ms period. That is, the terminal communication section 60 delays transmission of the comparison result image data to the projector 100 for the 1000-ms period (step S13).

The evaluation section 205 in the terminal apparatus 10 then evaluates whether or not the 1000-ms period has elapsed (step S14). When a result of the evaluation shows that the 1000-ms period has elapsed (YES in step S14), the evaluation section 205, when it determines that the 1000-ms period has elapsed, starts evaluating the comparison result image data developed in the virtual display 302 (step S15). The evaluation process that starts in step S15 is the same as those in steps S2, S7, and S11.

As described above, in the case where the comparison result image data developed when the 500-ms period elapses corresponds to the black image data, the evaluation delay period is further prolonged, and the following evaluation is performed after the evaluation delay period elapses. The evaluation section 205 can therefore further reduce the frequency of the evaluation of the comparison result image data and can hence reduce the evaluation burden. Further, since the terminal communication section 60 delays transmission of the comparison result image data for the 1000-ms period elapses, the frequency of the transmission can be reduced, whereby the burden of transmission of the comparison result image data to the projector 100 can be reduced.

The evaluation section 205 then evaluates whether or not the comparison result image data having started undergoing the evaluation in step S15 corresponds to the black image data (step S16). That is, the evaluation section 205 evaluates whether or not the comparison result image data developed in the virtual display 302 when the 1000-ms period elapses corresponds to the black image data.

When a result of the evaluation in step S16 shows that the comparison result image data having started undergoing the evaluation in step S15 does not correspond to the black image data (NO in step S16), the communication controlling section 202 in the terminal apparatus 10 transmits the comparison result image data to the projector 100 via the terminal communication section 60 (step S4). The terminal control section 200 of the terminal apparatus 10 returns to the process in step S1 and evaluates again whether or not one frame cycle has elapsed. The evaluation section 205 in the terminal apparatus 10 then evaluates the comparison result image data developed in the virtual display 302 when one frame cycle elapses.

On the other hand, when a result of the evaluation in step S16 shows that the comparison result image data having started undergoing the evaluation in step S15 corresponds to the black image data (YES in step S16), the display controlling section 201 evaluates whether or not the post-update image data, which is the target of the comparison that provides the comparison result image data having started undergoing the evaluation in step S15, is followed by image data to be developed in the video memory 301 (step S17). In a case where the post-update image data is not followed by image data to be developed in the video memory 301 (NO in step S17), the terminal control section 200 of the terminal apparatus 10 terminates the entire process. On the other hand, in a case where the post-update image data is followed by image data to be developed in the video memory 301 (YES in step S17), the terminal control section 200 returns to step S13 and waits until the 1000-ms period elapses. The evaluation section 205 then starts evaluating the comparison result image data when the 1000-ms period elapses after the evaluation of the comparison result image data in step S11.

In a case where the comparison result image data is evaluated after the 1000-ms period elapses and a result of the evaluation shows that the comparison result image data is the black image data, the evaluation section 205 performs the following evaluation after the 1000-ms period elapses. That is, in the present embodiment, the 1000-ms period is set to be the upper limit of the evaluation delay period, and the evaluation section 205 evaluates the comparison result image data by using the 1000-ms period as the cycle as long as the comparison result image data is continuously the black image data. As described above, the terminal apparatus 10 is so configured that an upper limit of the evaluation delay period is set and the evaluation delay period is prolonged stepwise until the upper limit is reached. In the thus configured terminal apparatus 10, the evaluation burden can be reduced, and the evaluation section 205 can quickly evaluate the comparison result image data in accordance with a change in an image displayed by the display section 90.

In the case where the evaluation section 205 determines that the comparison result image data is not the black image data, the communication controlling section 202 transmits the post-update image data that is the comparison result image data to the projector 100, as described above. The terminal apparatus 10 having the configuration described above therefore allows the burden of transmission of image data to be reduced and further allows the projector 100 to quickly project the same image as that displayed by the display section 90 in accordance with a change in the image displayed by the display section 90.

In step S17, the timing at which the process of evaluating whether or not image data to be developed in the video memory 301 is present is not necessarily carried out after step S16. For example, the process may be carried out after step S7 or step S11. Further, the process in step S17 may be carried out concurrently with the action in steps S1 to S16 in FIG. 4, and when a situation in which there is no image data to be developed in the video memory 301 is detected, an interruption may be outputted, and the entire process in FIG. 4 may be terminated in response to the interruption.

In the above description, the 100-ms period, the 500-ms period, and the 1000-ms period correspond to the second period longer than the frame cycle. In the case where the 100-ms period is used as the second period, however, the 500-ms period may be used as a third period longer than the second period. Further, the 1000-ms period may be used as a fourth period longer than the third period. That is, in this case, the first period is the frame cycle. The second period is the 100-ms period. The third period is the 500-ms period. The fourth period is the 1000-ms period.

As described above, the terminal apparatus 10 (image supplying apparatus) in the present embodiment includes the terminal communication section 60 (transmission section), which transmits image data to the projector 100 (display apparatus), the image data generating section 204 (data generating section), which generates the comparison result image data (comparison result data) representing a result of the comparison between the pre-update image data (first image data) and the post-update image data (second image data), and the evaluation section 205, which carries out the process of evaluating whether or not the comparison result image data generated by the image data generating section 204 is data representing that there is no difference between the pre-update image data and the post-update image data. In the case where the comparison result image data is not data representing that there is no difference between the pre-update image data and the post-update image data, the evaluation section 205 carries out the process of evaluating the comparison result image data whenever the frame cycle (first period) elapses. On the other hand, in the case where the evaluation section 205 determines that the comparison result image data is data representing that there is no difference between the pre-update image data and the post-update image data, the evaluation section 205 carries out the process of evaluating the comparison result data after the 100-ms period (second period) longer than the frame cycle elapses. Further, in the case where the evaluation section 205 determines that the comparison result image data is data representing that there is no difference between the pre-update image data and the post-update image data, the evaluation section 205 carries out the process of evaluating the comparison result data after the 500-ms period longer than the frame cycle elapses. Moreover, in the case where the evaluation section 205 determines that the comparison result image data is data representing that there is no difference between the pre-update image data and the post-update image data, the evaluation section 205 carries out the process of evaluating the comparison result data after the 1000-ms period longer than the frame cycle elapses.

As described above, according to the image supplying apparatus of the present embodiment and the terminal apparatus 10, to which the method for controlling the image supplying apparatus is applied, in the case where there is no difference between the pre-update image data and the post-update image data, the period that elapses before the evaluation section 205 evaluates the following comparison result image data is changed, whereby the frequency of the evaluation of the comparison result image data can be reduced, and the burden of the evaluation of the comparison result image data can therefore be reduced.

Further, the image data generating section 204 compares the pre-update image data and the post-update image data to be transmitted to the projector 100 via the terminal communication section 60 with each other to generate the comparison result image data. In the case where the evaluation section 205 determines that the comparison result image data is data representing that there is no difference between the pre-update image data and the post-update image data, the terminal communication section 60 does not transmit the pre-update image data to the projector 100. That is, in the case where the evaluation section 205 evaluates the comparison result image data, the terminal communication section 60 delays transmission of the post-update image data to the projector 100.

As a result, in the case where a result of the evaluation shows that the comparison result image data is data representing that there is no difference between the pre-update image data and the post-update image data, the post-update image data is not transmitted to the projector 100, that is, the transmission of the post-update image data to the projector 100 is delayed, whereby the burden of transmission of image data can be reduced.

The image data generating section 204 generates the comparison result image data. The comparison result image data is image data representing a result of the comparison between the pre-update image data and the post-update image data. The evaluation section 205 evaluates whether or not the comparison result image data generated by the image data generating section 204 is image data that satisfies a predetermined condition. In the present embodiment, the evaluation section 205 evaluates whether or not the comparison result image data generated by the image data generating section 204 corresponds to the black image data.

The evaluation section 205, when it evaluates the comparison result image data, performs the evaluation on the basis of a pixel contained in the comparison result image data because the comparison result image data is image data. More in detail, the evaluation section 205 evaluates whether or not a plurality of pixels contained in the comparison result image data are pixels representing black. The process of evaluating the comparison result image data on the basis of a pixel described above results in large evaluation burden because the evaluation is performed on a plurality of pixels. Therefore, changing the length of the period that elapses before the comparison result image data is evaluated allows reduction in the frequency of the evaluation, whereby the processing burden can be more greatly reduced, as compared with the process of evaluating image data on the basis of a pixel.

The terminal apparatus 10 is a portable apparatus that includes the battery 400a and operates on the basis of the electric power from the battery 400a.

In the configuration described above, in the case where there is no difference between the pre-update image data and the post-update image data, the frequency of the evaluation of the comparison result image data can be reduced, whereby the consumption of the electric power in the battery 400a can be suppressed.

The terminal communication section 60 wirelessly transmits image data to the projector 100.

In the configuration described above, the frequency of wireless transmission of image data to the projector 100 can be reduced, whereby the consumption of the electric power in the battery 400a can be suppressed.

The terminal apparatus 10 includes the display section 90, which displays an image on the basis of image data. The image data generating section 204 acquires the image data displayed by the display section 90 and compares the pre-update image data and the post-update image data with each other to generate the comparison result image data.

In the configuration described above, since image data representing an image to be displayed by the display section 90 is the target of the comparison, the evaluation section 205 can evaluate whether or not the comparison result image data is data representing that the image data displayed by the display section 90 does not change.

The embodiment described above is an example of a preferable embodiment of the invention, and an aspect in which the invention is implemented is not limited to the embodiment described above. The invention can be implemented in a variety of variations to the extent that they do not depart from the substance of the invention.

For example, in the embodiment described above, the first period is the frame cycle by way of example, but not necessarily. In the present embodiment, the first period only needs to be a period shorter than the 100-ms period. Further, in the embodiment described above, the second period is the 100-ms period, the 500-ms period, or the 1000-ms period by way of example. The second period is, however, not limited thereto and only needs to be a period longer than the first period and is preferably a period shorter than or equal to the 1000-ms period. Further, in the case where the comparison result image data is the black image data, the evaluation delay period is changed to the 100-ms period, the 500-ms period, or the 1000-ms period by way of example, but not necessarily. The number of values that the evaluation delay period can take may be so increased that the evaluation delay period can take discrete values between the 100-ms period, the 500-ms period, and the 1000-ms.

Further, for example, in the embodiment described above, the projector 100, which is a front-projection projector which performs projection from a position in front of the screen SC, is presented by way of example, but not necessarily. For example, the projector 100 may instead be a rear-projection projector that performs projection from a position behind the screen SC.

Further, for example, the process units in FIG. 4 are so configured that the entire process is divided in accordance with primary processing contents for ease of understanding of the entire process carried out by the terminal apparatus 10, and the invention is not limited by how to divide the entire process into process units or the name thereof. The entire process carried out by the terminal apparatus 10 may be divided into a greater number of process units. Further, one process unit may be so divided as to include a large number of processes.

Each of the functional portions shown in FIGS. 1, 2, and 3 represents a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions of the projector 100 and the terminal apparatus 10 can be arbitrarily changed to the extent that the change does not depart from the substance of the invention.

What is claimed is:

1. An image supplying apparatus comprising:
   a processor programmed to:
      transmit image data to a display apparatus;
      generate comparison result data representing a result of comparison between a first image data and a second image data;
      in a case where the comparison result data represents that there is a difference between the first image data and the second image data, evaluate next comparison result data after a first period elapses; and
      in a case where the comparison result data represents that there is no difference between the first image data and the second image data, evaluate the next comparison result data after a second period longer than the first period elapses such that the evaluation of the next comparison result data is delayed.

2. The image supplying apparatus according to claim 1, wherein the processor is programmed to:
   compare the first image data and the second image data to transmit to the display apparatus; and
   not transmit the second image data to the display apparatus in a case where the comparison result data represents that there is no difference between the first image data and the second image data.

3. The image supplying apparatus according to claim 1, wherein the processor is programmed to:
   generate comparison image data as the comparison result data; and
   evaluate whether or not the comparison image data satisfies a predetermined condition.

4. The image supplying apparatus according to claim 1, wherein
   the image supplying apparatus is a portable apparatus that includes a battery and operates based on electric power from the battery.

5. The image supplying apparatus according to claim 4, wherein the processor is programmed to:
   wirelessly transmit the image data to the display apparatus.

6. The image supplying apparatus according to claim 1, further comprising a display that displays an image based on the image data, wherein:
   the processor is programmed to acquire the image data to be displayed on the display.

7. A method for controlling an image supplying apparatus that transmits image data to a display apparatus, the method comprising:
   generating comparison result data representing a result of comparison between a first image data and a second image data;
   in a case where the comparison result data represents that there is a difference between the first image data and the second image data, evaluating next comparison result data after a first period elapses; and
   in a case where the comparison result data represents that there is no difference between the first image data and the second image data, evaluating the next comparison result data after a second period longer than the first period elapses such that the evaluation of the next comparison result data is delayed.

8. A non-transitory computer-readable medium storing a program to be executed by a controller that controls an image supplying apparatus that transmits image data to a display apparatus, the program causing the controller to:
   generate comparison result data representing a result of comparison between a first image data and a second image data;
   evaluate whether or not the generated comparison result data represents that there is no difference between the first image data and the second image data;
   in a case where the comparison result data represents that there is a difference between the first image data and the second image data, evaluate next comparison result data after a first period elapses; and
   in a case where the comparison result data represents that there is no difference between the first image data and the second image data, evaluate the next comparison result data after a second period longer than the first period elapses such that the evaluation of the next comparison result data is delayed.

* * * * *